Nov. 6, 1962 W. L. MORGAN ET AL 3,062,682
FIBROUS GLASS PRODUCT AND METHOD OF MANUFACTURE
Filed April 9, 1957 4 Sheets-Sheet 1
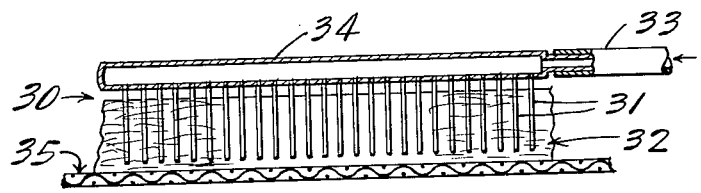
FIG-1-
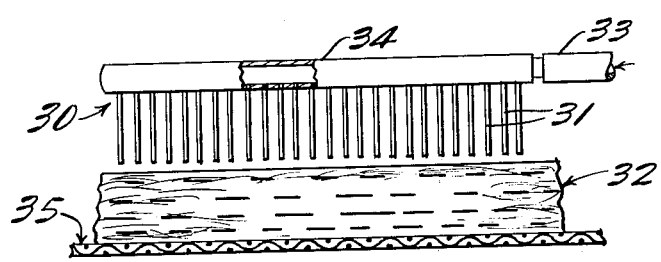
FIG-2-
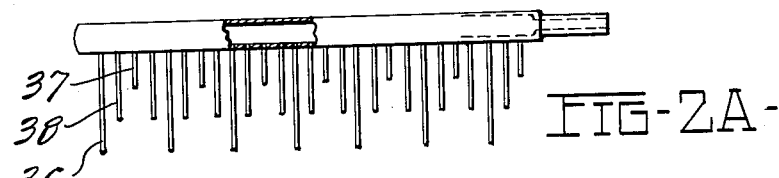
FIG-2A-
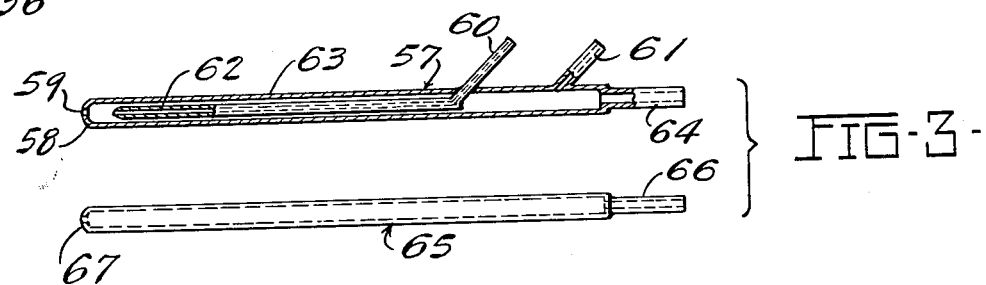
FIG-3-
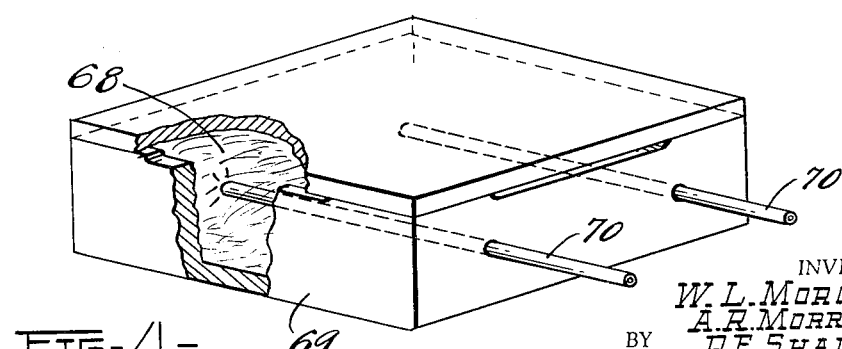
FIG-4-
INVENTORS:
W. L. MORGAN,
A. R. MORRISON,
R. F. SHANNON.
BY Stadin & Overman
ATTYS.

Nov. 6, 1962 W. L. MORGAN ET AL 3,062,682
FIBROUS GLASS PRODUCT AND METHOD OF MANUFACTURE
Filed April 9, 1957 4 Sheets-Sheet 2
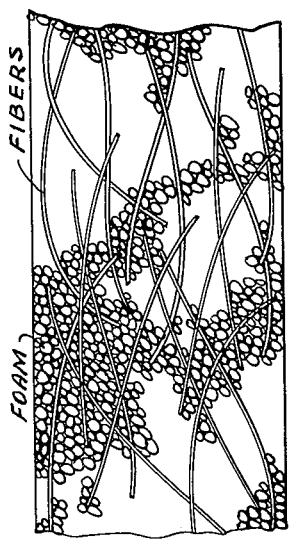
FIG-7-
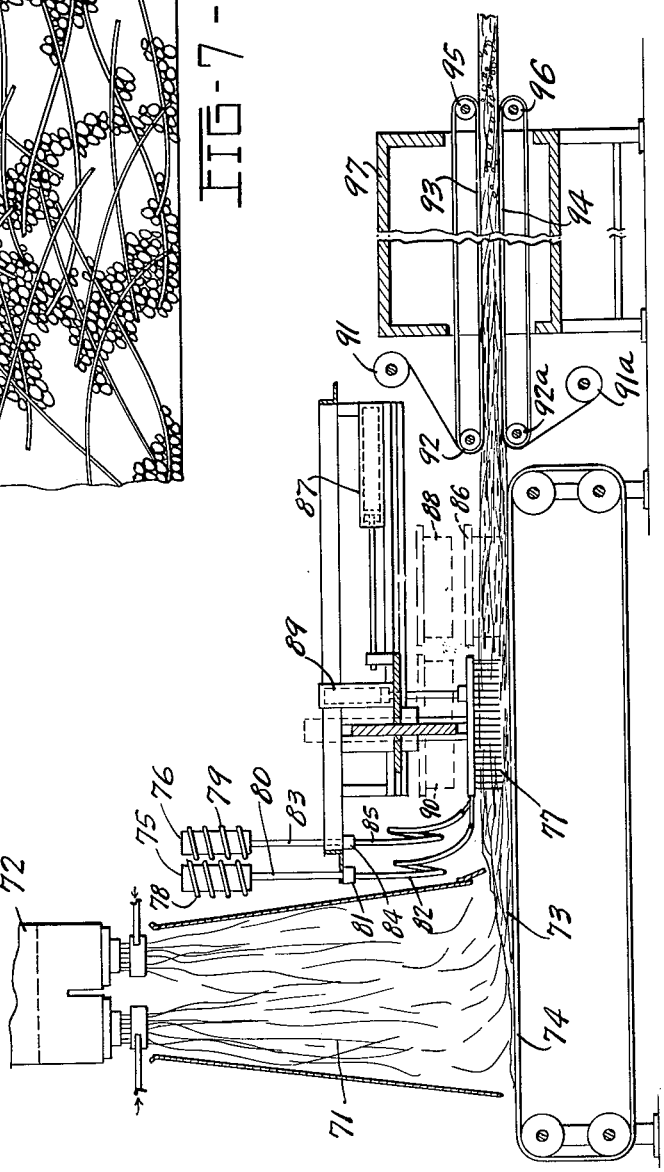
FIG-5-
INVENTORS:
W. L. MORGAN.
A. R. MORRISON.
BY R. F. SHANNON.
Staelin & Overman
ATTYS.

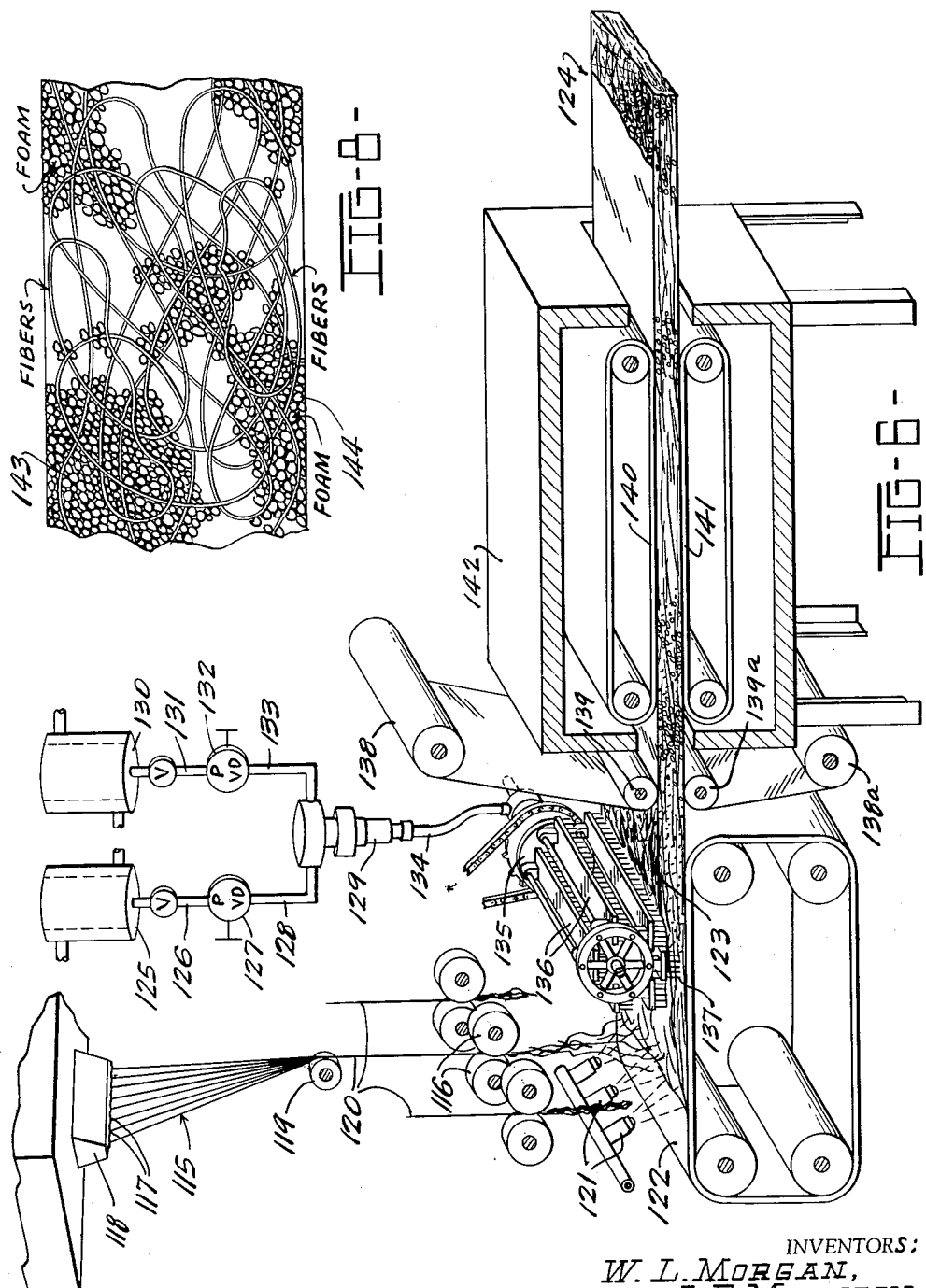

Nov. 6, 1962 W. L. MORGAN ET AL 3,062,682
FIBROUS GLASS PRODUCT AND METHOD OF MANUFACTURE
Filed April 9, 1957 4 Sheets-Sheet 4
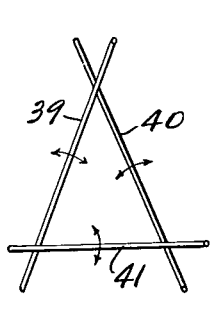
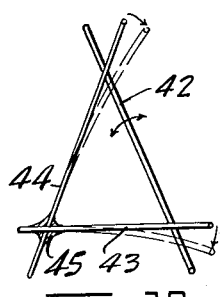
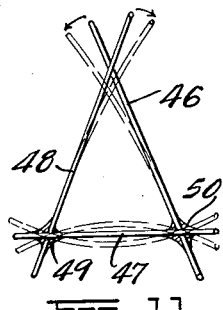
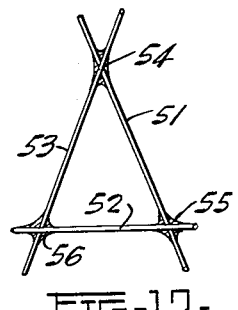
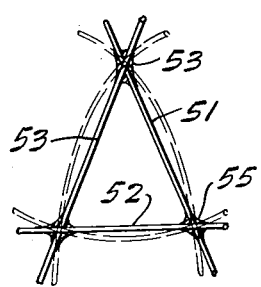
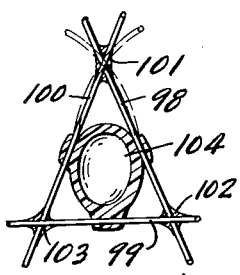
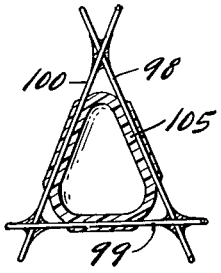
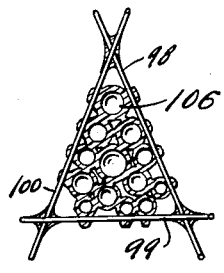
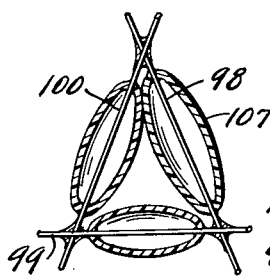
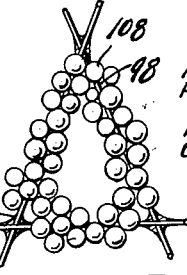
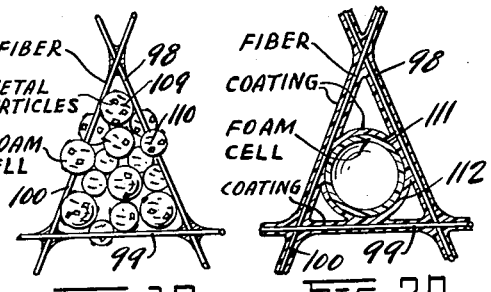
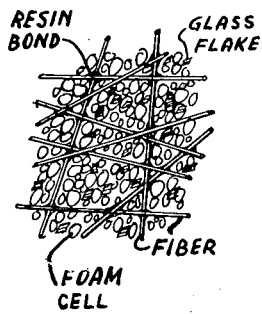
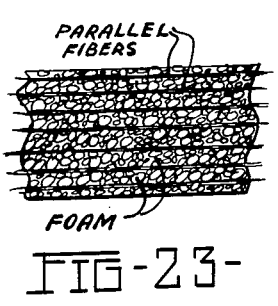
INVENTORS:
W. L. MORGAN,
A. R. MORRISON,
BY R. F. SHANNON.
ATTYS.

United States Patent Office 3,062,682
Patented Nov. 6, 1962

3,062,682
FIBROUS GLASS PRODUCT AND METHOD
OF MANUFACTURE
Willard L. Morgan and Albert R. Morrison, Newark, and Richard F. Shannon, Lancaster, Ohio, assignors to Owens-Corning Fiberglas Corporation, a corporation of Delaware
Filed Apr. 9, 1957, Ser. No. 651,645
5 Claims. (Cl. 117—120)

This invention relates to a method for producing a composite foam and mineral product, and more particularly to a method for producing such a product composed of mineral fibers associated with a foamed material.

Various suggestions have heretofore been made for producing structures composed of a foamed material in a set condition, which set condition can range from elastomeric, as in the case of foamed rubber, through various intermediate degrees of hardness to substantially unyielding materials, as in the case of foamed inorganic cementitious materials which have found some use as insulating materials.

It has also been suggested that various fillers, fibrous and granular in nature, can be admixed with numerous foamed materials prior to hardening or setting thereof in order to modify the properties of a finished article produced after setting of the foam. For example, the use of dyes or pigments to color the finished products, the use of inert finely divided extenders, and the use of fibrous fillers to increase the strengths have all been suggested. A serious problem has been encountered, however, when it has been attempted to increase the strengths or other physical properties by admixing a fibrous filler with a foamable resin and then setting the resin.

It has been found that most methods which might be expected to be capable of achieving the desired result enable the introduction of only a comparatively small proportion of the fibrous filler with the result that achieving substantially improved physical properties by virtue of incorporation of the fibrous filler in the foamed material is impossible.

When fibrous fillers of sufficient length to be effective at improving physical properties are mixed with a material to be reinforced in sufficient amount to be significantly advantageous, it is found that balling occurs during attempted mixing. In general, limited amounts of fibers of any given length and diameter can be so mixed without balling. However, the tendency towards balling increases when fiber diameter is decreased and when the length is increased. Fibers having a diameter more than about 150 hundred-thousandths of an inch and fibers shorter than about ½ inch are not significantly effective for reinforcement. Fibers having a diameter less than 150 hundred-thousandths of an inch and longer than about ½ inch cannot be mixed with a material to be reinforced in effective proportions without balling.

It has been found that the addition of a fibrous material to liquid foamable materials causes an increase in viscosity of the foamable materials with the result that it is very difficult to stir in more than about 10 percent by weight of fibers based upon the weight of the foamable material. Mixing fibrous materials into a liquid foamable material always causes some damage to the fibers. The damage may involve breaking which decreases fiber length and lowers strand integrity. As a consequence, physical properties of the final product are inferior to those which should be achieved with the amount of reinforcement provided by the fiber sizes charged.

The present invention is based upon the discovery of an improved method for producing a structure which includes mineral fibers associated with or bonded to a foamed, set material, which method enables the production of such a structure containing a heretofore unachievably high proportion of the mineral fibers. The method is extremely effective for producing structures comprising mineral fibers and a foamed, set material in any desired proportions within an extremely broad range.

In general, the invention comprises processes and products formed by the injection or insertion of a liquid foamable material into a fibrous mass using a plurality of needles. This is accomplished by having an assembly which comprises a number of individual needles connected by a suitable manifold to a supply of foamable materials, foaming agents and accelerators. The injection needle is so constructed as to permit thorough mixing of the foamable material, foaming agent and accelerator immediately before the mixture is injected into the fibrous mass. The needles may be of varying lengths to obtain the desired distribution of foaming material within the mass or the needles may be of equal length and proper distribution of the material obtained by insertion of the assembly into the fibrous mass and the injection of the foamable material into it as the needle assembly is being withdrawn. The materials as injected into the fibrous mass may be foamed, foaming or foamable materials such as for example, organic materials including one or more of the following: phenol formaldehyde, polyurethane, urea formaldehyde, polyvinyl chloride or polystyrene employing a suitable blowing or foaming agent as desired. The material thus injected may also be an inorganic cementitious substance such as for example, magnesium oxysulfate or gypsum plus materials to form a foam. The fibers and associated materials can then be brought to a predetermined product dimension and the binder or foamed material advanced to a fully set condition by providing reaction time or heating as necessary to complete the foaming to form the foamed product and to obtain any desirable bonding between the fibrous mass and the foamed material.

In general, the products of the invention are unique in the amount and length of mineral fiber incorporated into and reinforcing the rigid or flexible foamed structure which fills the interstices between the fibers to either a minor or major degree. The products are also characterized by the fact that the fibers are intermeshed into a pack having bodily integrity and are not merely dispersed randomly in the foam. This results from the relatively long fibers employed and from the substantially large amount of fibers present and from the bonded condition which may be existing at fiber junctures and the further bonded condition along the lengths of the fibers where they are adhered generally to the foamed material. Thus, as the fibers are held to the foamed material at numerous points, and as the foamed material is present as expanded generally closed, gas-filled cells, more or less completely filling the voids between adjacent fibers or fibers and glass flakes, the fibers are bound closely and are either held rigidly or are restricted in their freedom to bend. Thus, the full reinforcing effect of the glass fiber is utilized in the products. Low density products of foamed resins, which without the fiber reinforcement are too fragile to be useful, can be made with high degrees of strength and resistance to compression. Also, dimensional stability is achieved through the use of fiber reinforcement. Thus, low amounts of expensive resins may be used at savings by the use of relatively inexpensive fibers to prepare very light and very strong board-like products suitable for wall and roof boards, insulation uses, and lightweight molded articles.

The invention includes such articles of both flexible and rigid character, and laminations of such board-like elements with either other reinforced foam boards or with foam boards of somewhat different density, flexibility or rigidity or of foams of non-fiber reinforced character as well as similar single or multiple layer products, including layers of facings of continuous web materials such as paper, cellophane, aluminum foil, or other plastic films such as vinyl, polyethylene terephthalate, or polyethylene.

It is therefore an object of the invention to provide an improved method for producing a structure which includes mineral fibers associated with or bonded to a foamed, set material or binder.

It is a further object of the invention to provide an improved structure which includes mineral fibers associated with or bonded to a foamed, set material or binder, which structure can be produced by a new method of the invention.

It is another object of the invention intimately to associate a foamable, settable material with a mass of mineral fibers intermeshed to an extent such that the mass has bodily integrity, and to foam and set the material while associated with the mass and while in an enclosed zone.

It is a further object of the invention to provide a means for introducing the foamed, foaming or foamable material into a fibrous mass thereby forming a structure of a uniform composition.

It is a further object of the invention to provide an improved structure containing a foamed material uniformly dispersed within and associated with a fibrous mass of mineral fiber with the fiber content of sufficient amount to impart the desired improvements in the physical properties of the product.

Other objects and advantages will be apparent from the description which follows, reference being had to the accompanying drawings, in which:

FIGURE 1 is a vertical sectional view of an assembly of needles through which foamable, foamed or foaming material can be injected or inserted into a mass of mineral fibers;

FIGURE 2 is a view similar to FIGURE 1 with the needle assembly withdrawn from the fibrous mass;

FIGURE 2A is an elevational view of a modified needle assembly;

FIGURE 3 is a sectional view of two types of needles which can be used in this invention;

FIGURE 4 illustrates a modification of the invention whereby the needles are inserted into a closed container;

FIGURE 5 shows an elevational view of a continuous process for producing a fibrous mass of discontinuous mineral fibers containing a foamed material using the needle injection technique;

FIGURE 6 is an elevational view of a continuous process for producing a continuous textile fiber mass associated with a foamed material;

FIGURE 7 is a view of an article produced from discontinuous mineral fiber and a foam binder;

FIGURE 8 is a view showing the product that can be made with the apparatus of FIGURE 6;

FIGURE 9 is a view of a fragment of an open mass of mineral fibers useful in practicing the invention and representing one type of intermeshing of fibers which relies upon no binder, but provides bodily integrity to the mass of fibers;

FIGURE 10 is a view showing a modified type of intermeshing where some binder is effectively contributing to the bodily integrity of the mass by interlocking individual fibers;

FIGURE 11 is a view showing a greater quantity of binder to increased bodily integrity;

FIGURE 12 is a view showing a still greater amount of binder effective to increase bodily integrity;

FIGURE 13 is a view showing a type of fiber movement which is possible in the FIGURE 12 structure when the mass is subjected to a load;

FIGURE 14 is a view of a fragment of a mass of intermeshed and interlocked mineral fibers intimately associated with a foamed material;

FIGURE 15 is a view showing a different configuration of a foamed material intimately associated with the fibers;

FIGURE 16 is a view showing a plurality of small cells of a foamed material intimately associated with the fibers;

FIGURE 17 is a fragmentary view showing still another spatial configuration of foamed material intimately associated with a mass of mineral fibers;

FIGURE 18 is a view showing a fragment of a mass of intermeshed mineral fibers intimately associated with a foamed material adhered to the fibers;

FIGURE 19 is a view showing a material such as metal particles and a foamed material intimately associated with a mass of mineral fibers;

FIGURE 20 is a view showing the structure which results from a further modification involving the application of a binder as a coating;

FIGURE 21 is a view showing the modification where the mass of mineral fibers intimately associated with a foamed material has been impregnated with a binder;

FIGURE 22 represents a structure comprising a foamed material intimately associated with mineral fibers and thin glass flakes or platelets; and FIGURE 23 is a view of a product comprising a foamed material associated with generally parallel mineral fibers.

Referring now in more detail to the drawings, see FIGURE 1, an assembly 30 of needles 31 are shown inserted into a mass of mineral fibers 32. Inlet 33 introduces foamed or foamable material through manifold 34 to needles 31, 31. The needles may be of equal length for injecting the foamed or foamable material into one specific part of the fibrous mass 32 or uniform distribution of the material can be obtained by injecting the material as the needle assembly is being withdrawn from the fibrous mass. The needles may vary in length as shown in FIGURE 2A in order to obtain a uniform distribution of the foamed or foamable material in the fibrous mass 32, while the needle assembly remains stationary during the injection period. This needle assembly comprises long needles 36, short needles 37 and intermediate needles 38 arranged as shown. The mass of fibers is supported upon conveyor 35 while being treated.

An assembly of needles withdrawn from the fibrous mass after injection of the foamed, foaming or foamable material into the mass is shown in FIGURE 2. The mass of fibers 32 comprises mineral fibers which are intermeshed to an extent such that the mass has bodily integrity. The intermeshing which gives bodily integrity to the mass 32 can be achieved by fiber to fiber friction when the individual fibers are of relatively great length, for example, of the order of at least about ½ inch. Such a mass can be produced by the so-called glass wool process, for example, as disclosed in Slayter et al. Patent 2,206,058, or by the so-called "Rock-Wool" process where a stream of molten materials of a suitable composition is discharged through a relatively large diameter orifice and into a blast of steam which breaks up the relatively large diameter stream into small bodies of the molten material which are projected by the steam at high velocities, drawn into relatively small diameter fibers and collected on a suitable conveyor. A mass of intermeshed mineral fiber can also be produced by tangling continuous textile fibers or strands, for example, on a suitable conveyor.

In producing presently available mineral fiber products by any of the above methods or by other improved or similar methods, it is customary to associate some kind of a binder or size with the relatively fine mineral fibers. Such procedure can be employed in producing the mass 32 and will increase the bodily integrity of the mass by interlocking of the mineral fibers. In general, any mass of mineral fibers has bodily integrity if the mass moves as a whole when it is picked up by any part or if the mass will support its own weight across a limited but appreciable unsupported span or from a conveyor to a pair of cooperating drive rolls.

A mass of mineral fibers can have the degree of bodily integrity defined above when the individual fibers therein have a sufficient average effective length, and are intermeshed with one another so that the use of a binder or size may not be essential to provide the bodily integrity.

A mass of mineral fibers having a lesser degree of bodily integrity than that identified in the examples of the preceding paragraph may have the minimum requisite degree thereof for practicing the present invention. The minimum requisite degree of bodily integrity is the least which will enable the mass to withstand, without substantial fiber deformation, the forces to which the mass is subjected during foaming of the foamable material and passage of the foam or foamable material through the mass. The minimum requisite degree of bodily integrity, therefore, depends upon the stresses exerted on the mass during a particular series of processing operations. The stresses that are exerted are partly mechanical in nature, incident to handling of the mass and the result of passage of the foamable, foaming or foamed material through the mass.

Where the material is injected into the fibrous mass in such a manner that the material is uniformly distributed throughout the fibrous mass before foaming, the degree of bodily integrity can be somewhat less in that the forces exerted on the mass during foaming are lessened. In this instance, the material need not pass through a substantial portion of the pack to reach its final position therein.

The mass of mineral fibers must not only have the requisite degree of bodily integrity as indicated but must also be one wherein the mineral fibers are present in an open pattern so that the foamable material can pass to a limited degree through the mass. The degree of openness of the mass and the diameter of the individual fibers, as well as the viscosity of the material, all affect the stresses to which the mass is subjected during processing, but these variables are within operable limits so long as the mass itself has bodily integrity during the processing. References to foam that follow will include foaming, foamed or foamable materials.

A fragment of a mass comprising mineral fibers 39, 40 and 41, which mass is produced without any binder, is shown in FIGURE 9. The fragment in FIGURE 9 is represented as generally triangular and planar because such is the simplest mechanical arrangement. It will be apparent, however, that various other spatial arrangements of fibers occur in any mass of mineral fibers that is produced. The mass has bodily integrity solely by virtue of frictional forces exerted by one fiber on the others. A mass comprising mineral fibers 42, 43 and 44, where the fibers 43 and 44 are bonded to one another by a globule 45 of any suitable binder is shown in FIGURE 10. The fibers 39, 40 and 41 of FIGURE 9 structure are free to move when subjected to forces which will overcome the friction which gives the mass bodily integrity as is indicated by the arrows. In the FIGURE 10 structure, on the other hand, only the fiber 42 is free to move in a similar manner as the fibers 43 and 44 are retained in position by the globule 45. The unbonded ends of the fibers 43 and 44, however, are free to bend generally as suggested by the dotted positions represented for these fibers.

A fragment of a mass comprising mineral fibers 46, 47 and 48 is shown in FIGURE 11. The fiber 47 is bonded by globules 49 and 50 of a suitable binder to the fibers 48 and 46, respectively. The fiber 47, therefore, is supported in a substantially fixed position while each of the fibers 46 and 48 is free to bend under stress generally as is indicated by the dotted positions represented.

A fragment of a mass comprising mineral fibers 51, 52 and 53 wherein the fibers 51 and 52 are bonded together by a globule 55 of a suitable binder, the fibers 52 and 53 are bonded together by a globule 56 of a suitable binder, and the fibers 51 and 53 are bonded together by a globule 54 of a suitable binder, is represented in FIGURE 12. All of the fibers in FIGURE 12 mass are rigidly held in position and are free to bend when subjected to stress, generally to the positions represented in FIGURE 13, or to corresponding positions where one or more of the fibers bend in any other direction or plane in the space surrounding the fragment of the mass. It will be appreciated that any given mass of intermeshed fibers which includes a binder will include some structure of the type shown in FIGURE 10, some of the FIGURE 11 type and some of the FIGURE 12 type. Which type of structure predominates will depend upon the relative amounts of fiber and binder and various other factors.

When relatively long lengths of mineral fibers are used to produce a mass having bodily integrity by virtue of intermeshing of the individual fibers, any of the structures shown in FIGURES 9 through 12 can be employed depending upon the particular properties desired in the fibrous mass. In general, for any given fiber length the stiffness of the mass of fibers increases from the FIGURE 9 structure to the FIGURE 10 structure, from the FIGURE 10 structure to the FIGURE 11 structure, and from the FIGURE 11 structure to the FIGURE 12 structure. All of the structures represented are advantageous; which is most desirable depends upon the properties desired and the end use to which the ultimate product is to be put. The fibers in any of these structures (see FIGURES 20 and 21) may also carry a coating of a binder or size material which can be the same as or different from the binder, if any, which holds the individual fibers in position at points of contact.

When it is desired to use relatively short fiber lengths to produce a mass, at least some binder is required to provide the bodily integrity, for example, as shown in the structures of FIGURES 10 through 13, inclusive. A binder imparts bodily integrity to a mass of mineral fibers by mechanically bonding discrete fibers in the mass to one another at points of contact. In the case of hardened thermosetting type such bonding might be likened to gluing, but in the case of relatively viscous liquid binders, the bonding is more of a frictional nature, the binder having principally the effect of increasing the frictional engagement between adjacent fibers at points of contact and of adding to such frictional forces the adhesive effect of the binder which is largely the effect of its viscosity. A mass of intermeshed mineral fiber may be produced from a continuous textile type mineral fiber strand. If desired, any of the usual binders or sizing materials which are used in producing articles from mineral fibers can be employed to increase the bodily integrity of the mass of fibers 32 similarly as in the structures of FIGURES 10 through 13, inclusive.

Representative thermosetting synthetic resinous materials that can be used for this purpose include phenolic resins, such as phenol- or substituted phenol-aldehydes, urea-aldehydes, melamine-aldehydes, polyesters, epoxy resins, silicones, furfurals, gelatin formaldehydes, and similar thermosetting partial condensation products. Representative thermoplastic synthetic resinous materials that can be so employed include polyvinyl alcohol, polyvinyl acetate, polyvinyl chloride, polyvinyl butyral, polyethylene, polystyrene, polyamides, coumaroneindenes, polyvinylidene chloride, cellulose acetate, ethyl cellulose, alkyds, methylmethacrylate, ethylmethacrylate, cellulose acetobutyrate, and other similar known materials. Various elastomeric materials can also be employed, for example, natural rubber, polychloroprene, polybutadiene, polybutene, styrene-butadiene copolymers, butadiene-acrylonitrile copolymers, polysulfide elastomers, and the like. In addition, various synthetic and naturally occurring binder materials such as starch, albumen, casein, carboxymethyl cellulose, polyvinyl-pyrrolidone, terpenes, shellac, asphalt and various natural glues are likewise suitable. Also, various mineral and vegetable oils and composition comprising mineral and vegetable oils which have been suggested for use as sizes on such mineral fibers can be employed to interlock individual fibers and to provide for increased bodily integrity of the mass, as discussed above.

The specific identity of the foamable, foaming or foamed material in the assembly of FIGURE 1 constitutes no part of the instant invention. Broadly speaking, the foamable binder can be either organic or inorganic in nature. A phenol formaldehyde partial condensation product, or "A-stage" resin with ammonium carbonate mixed therein at the point of injection from the needles is a specific example of such a foamable binder. Ammonium carbonate is a material which will evolve a gas when heated to a temperature below that at which final curing of the partial condensation product occurs.

The gas evolution causes foaming of the binder and further heating cures the resin while in the foamed condition. Examples of other materials which evolve a gas upon heating to temperatures below those at which curing of a resinous binder can be accomplished include sodium bicarbonate, dinitroso-pentamethylenetetramine, N,N'-dimethyl N,N'-dinitrosoterephthalamide, and p.p' oxy bis (benzene sulfonyl hydrazide). A volatile solvent such as isopropyl ether, water, or the like can also be mixed with the binder and vaporized by heat to cause the desired foaming. A resinous binder can also be made foamable by dispersion therein of finely divided solid carbon dioxide or other frozen gas, or by inclusion of materials which will react to evolve a gas, for example, aluminum or magnesium and an acid or alkali, or calcium carbonate and an acid.

Other synthetic resinous organic binders than phenol formaldehyde partial condensation products can also be made foamable in the indicated ways. For example, other thermosetting binders such as other phenol aldehyde condensation products, urea-aldehyde partial condensation products, melamine aldehyde partial condensation products, resorcinol aldehyde partial condensation products, polyesters, epoxy resins, silicones and furfuryl-aldehyde partial condensation products, and the like can be so blended to produce a foamable material and employed in the embodiment of the invention shown in FIGURE 1.

In addition, inorganic binders can be made foamable in any of the indicated ways and so employed. Preferred inorganic binders are cementitious in nature. Gypsums, Portland cement, magnesium oxysulfate, magnesium oxychloride, zinc oxysulfate, zinc oxychloride, magnesium oxyphosphate, zinc oxyphosphate, alumnite cement, metal silicates such as calcium silicate and aluminum silicate, pozzolanic cements, and colloidal silicic acid are among the preferred inorganic cementitious binders.

Various thermoplastic binders, natural and synthetic, can also be mixed with foaming agents and used in such embodiment. Examples of such binders include polyvinyl acetates, polyvinyl alcohols, polyvinyl chlorides, polyvinyl butyrals, polyvinylidine chlorides, cellulose acetates, ethyl cellulose, asphalt, poly-methylmethacrylates, poly-ethylmethacrylates, cellulose acetobutyrates, terpenes such as those available under the trademark "Vinsol," shellac, gelatin-formaldehyde materials, casein, carboxymethyl cellulose, polyvinylpyrrolidene, natural rubber, polychloroprene, polybutadiene, polybutene, acrylonitrile, butadiene acrylonitrile copolymers, polysulfide elastomers, butadiene acrylonitrile copolymers, and the like.

Foamable binders which are vinyl chlorides, vinylidene chlorides, vinyl chloride-vinylidene chloride copolymers, and epoxy resins are particularly suited for use in practicing the invention.

Polyurethane foamable organic binders can be employed in practicing the method of the FIGURE 1 embodiment of the invention. A polyurethane foam can be produced from a polyester, an isocyanate, and an amine accelerator in the presence of water. Such a mixture begins foaming shortly after the various constituents are brought together so that intimate mixing must be accomplished rapidly and the admixture produced must then be promptly disposed of in the desired manner for foaming.

Mixing of the various constituents of a foamable material can be accomplished in the needles 31, 31 of FIGURE 1. A needle which is particularly useful for mixing is indicated at 57 in FIGURE 3. This construction brings the foamable resin, catalyst and foaming agent together at the tip 58 of the needle at which point it is thoroughly mixed while being injected through small holes 59 in the end of the needle. The needle 57 provides for the mixing of two materials, each of which might contain one or more ingredients.

The two materials enter the needle 57 at points 60 and 61 and are forced by pressure through concentric tubes 62 and 63, respectively, to the needle tip 58 at which point they are mixed and ejected from the system. Although FIGURE 3 provides for only two materials or mixtures of materials to be brought separately into the needle, a plurality of tubes 62 can be applied to this invention, if desired. Air or other suitable gaseous materials may be introduced through port 64 to assist in ejection of the material from the needle and to impart foaming by the inclusion of gaseous bubbles within the material.

A different type of needle 65 in which premixed or prefoamed materials can be added is shown in the lower part of FIGURE 3. These materials enter the needle at port 66 and are ejected from the tip 67. This type of needle can also be used to inject steam, hot air, or other heated gaseous materials into the pack to foam the materials deposited therein by either of the two needles indicated in FIGURE 3 or to effect curing, setting, or drying of the foamed material. Thus, these needles may be used together in certain applications.

The foamable binder can be a resinous material in which a gas is dispersed under pressure, as is suggested in U.S. Patent 2,023,204. In such instances, foaming occurs almost immediately upon release of the pressure from the resin.

In the embodiment of this invention, which has been described in connection with FIGURE 1, a foamable binder material has been employed. In some instances it may be advantageous to use a foamable material which is not a binder because it does not adhere to the fibers 32. In such case, after foaming the material is intimately associated with the mineral fibers and fills voids therebetween, but is not bonded thereto. The mass of fibers and the foamed material then both contribute insulating properties and structural integrity to the mass.

Such a structure can be produced when the fibers are coated with a release agent such as a silicone, for example, which prevents wetting of the fiber by the foaming material. D.C. 200 Fluid which is a silicone produced from a dimethyl silane is an example of a silicone release agent.

It will be appreciated that the precise chemical mechanism involved in advancing a binder to a set condition will depend upon the chemical nature of the binder. For example, in the case of a thermosetting synthetic resinous binder material, heat will be involved in the final curing to advance the material to a hard condition. Such heat may be generated by an exothermic curing reaction, may be supplied to effect curing, or both. In the case of a thermoplastic material, for example, with a thermally decomposable material dispersed therein, heat will be required to soften the resin and also to decompose the material dispersed therein to release a gas to cause foaming, but cooling will be required to convert the resulting foam to a condition which is stable at rom temperature. In a case where the foamable binder is one which is impregnated under pressure with a gas, release of the pressure will cause almost instantaneous foaming, accompanied by substantial chilling of the resinous binder so that when the binder is a thermoplastic material such as polstyrene maintained under pressure at a temperature slightly above its softening temperature, the rapid cooling may almost simultaneously, upon release of the pressure, accomplish both foaming and setting of the resin. When the binder is a rubber or other elastomeric material, setting may be a vulcanizing or similar reaction and in the case of the various cementitious inorganic binders, the setting may involve relatively slow chemical reactions which are not fully understood, e.g., as is the case with Portland cement.

It will be appreciated that the embodiment of the invention shown in FIGURE 1 and described in connection therewith is not limited to the forming of flat shapes as shown. The support for the fibrous mass and foam structure can be contained in any desired way so that an article of a particular shape is produced directly. The fibrous mass associated with a foam can be placed in a mold having any desired shape, while the foam can be advanced to a hardened or set state. The mold and the cover can also be lined with an appropriate sheet material or the finished article can be sprayed with a binder so that surface layers different from the core are provided. For example, surface layers having properties such as toughness, hardness, resiliency, or the like can be produced. Numerous lightweight articles of relatively simple shape can be produced in this manner. For example, boats, bath tubs, crash helmets, and the like can be produced. Suitable dyes or pigments can be used on the exterior to provide any desired color.

Products having a variation of physical properties throughout their thickness can be produced by this invention. The foam can be injected into one side of the fibrous mass leaving the other side of the mass unassociated with the foam; or the foam can be positioned in the center of the mass with none at the faces; or the fibers at both faces can be associated with the foam with a center portion of the fibrous mass being relatively free of foam. The latter product would be of particular value as an insulation board having structural and impact strength. It is also possible to inject more than one type of foam into the mass so that one surface contains an elastomeric foam and the other a hard, rigid foam.

Referring now to FIGURE 4, another modification of the needle injection method for depositing foam within a fibrous mass is shown. The fibrous mass 68 is disposed in a mold or container 69. Needles, 70, 70 are inserted into the fibrous mass through opening in the side of the mold. The needles 70, 70 are of the types illustrated in FIGURE 3. The foam is injected into the fibrous mass through the needle and curing, hardening or setting of the foam is accomplished by heating the mold from an external source of heat, or by injecting heat or a hot gaseous material into the mold through needles of the type indicated at 65 in FIGURE 3. Thus, both the combination of the foam with the fibrous mass and setting of the foam can be accomplished while inside the mold. Expansion of the foamable material while within the enclosed zone forces it into intimate association with the fibers in the mass 68. When the foamable material is a binder, final setting of the foam results in a fibrous pack tightly bonded to the foamed binder. When the material is not a binder, the fibers are intimately associated therewith but not bonded thereto in the finished product.

In FIGURE 5 apparatus particularly adapted for practicing the invention in a continuous manner is shown. Discontinuous fibers 71 are blown or formed from a source of molten glass 72 and deposited into a fibrous mass or pack 73 on a conveyor 74. The foam handling apparatus comprises tanks 75 and 76 and means for metering liquids flowing from each of the tanks in desired proportions and for pumping and conveying the two liquids to needle assembly 77. A dispersion comprising an appropriate polyester material, water, a dispersing agent and an amine accelerator is contained in tank 75 at a desired temperature by circulating either a heated or a cooled liquid through heat exchange coil 78. Diisocyanate, for example, 2,4-toluene diisocyanate is contained in tank 76 at a desired temperature by circulating either a heated or a cooled material through heat exchange coil 79.

The polyester-water-amine dispersion flows from the tank 75 through line 80, metering pump 81, and line 82 to needle assembly 77 where it is mixed as it is being ejected from the needle with the diisocyanate which flows from tank 76 through line 83, metering pump 84 and line 85. A foamable polyurethane is produced as the two liquids are mixed in the needles 57, 57 of FIGURE 3. The foamable mixture is injected into the fibrous pack 73 as the needle assembly is moving along with the pack. Needle assembly 77 is attached to a mechanical device which through a system of cams permits the assembly to move with the fibrous mass at the same speed of the mass until it reaches the position 86 shown in dotted lines. At this point injection of the foamable liquid is interrupted and the needle assembly 77 is raised vertically until the needles have cleared the fibrous mass at position 88. The needle assembly is then moved transversely from position 88 to position 90 by actuation of cylinder 87 at which point it is lowered to its original position 77 by the actuation of cylinder 89 and the injection of foamable liquid into the fibrous mass again initiated. The needle assembly can have needles of equal length or of unequal length, as desired. A sheet of cellophane, metal foil, polyethylene, or other similar flexible material is passed from an upper supply roll 91 and under upper guide roll 92, while another sheet of material is passed from lower supply roll 91a and over lower guide roll 92. After the mass of fibers associated with the foamable polyurethane material passes between the rolls 92 and 92a, the polyurethane foams and sets due to the reaction between the diisocyanate and the water. The reaction is accelerated by the amine, carbon dioxide is liberated, and cross-linking and setting of the polyester takes place. Foaming occurs while the fibrous pack and the polyurethane are within the zone between impervious conveyors 93 and 94, which pass over the rolls 92, 92a and over a pair of suitably driven rolls 95 and 96. Heat is applied within zone 97, if desired.

Another apparatus particularly adapted for practicing the invention is shown in FIGURE 6. Continuous fibers 115 are formed by pulling wheels 116 which attenuate the molten streams flowing from orifices 117 at the bottom of a feeder 118. A size or binder may be applied to the filaments by gathering wheel 119 as they are being gathered into an advancing strand 120. The sizing serves to give strand integrity to the bundle of filaments or strand 120, serves as a bonding agent to effect better adhesion between the fibers and the foam which is to be applied in a later step, and serves as one or more components of the foamable mixture. Multiple pulling wheel set-ups are used as indicated to introduce multiple strands into the pack 123. These sizes or binders may also be sprayed on the strands or fibers with nozzles 121 as they are being deposited on conveyor 122 in the form of a pack of fibers. Solid materials such as flake glass, metal flake, expanded mica and polystyrene beads can be dispersed within the fibrous pack 123 as the fibers are deposited on conveyor 122 to impart desired physical properties to final product 124.

A mixture of a low, free-formaldehyde phenol formaldehyde resin, isopropylether and polyoxyethylene sorbitan monopalmitate is prepared and stored in container 125 from which it flows through line 126, metering pump 127 and line 128 to mixing device 129. In a like manner, a solution of sulfuric acid is mixed and stored in container 130 from which it flows through line 131, metering pump 132, through line 133 to mixing device 129. The foamable material leaving mixing device 129 is forced through line 134 to circular manifold 135 from which point it is distributed to manifold plates 136 which serve as a manifold for the injection needles 137, 137. In operation the needle assembly comprised of circular manifold 135, manifold plates 136 and needles 137 revolves with a peripheral speed equal to that of the lineal speed of conveyor 122. The needles are alternately inserted into the fibrous mass 123 and withdrawn. The foamable mixture is injected from the needles only while they are at least partially inserted in the fibrous mass. A sheet of foil, paper, polyethylene or other similar flexible material is passed from an upper supply roll 138 and under upper guide roll 139, while a similar sheet material is passed from a lower supply roll 138a and over lower guide roll 139a. After the pack 123 passes between rolls 139 and 139a, the penol formaldehyde material associated with it foams and sets by virtue of the reactions between the surfuric acid and the phenol formaldehyde resin. Heat is involved in this reaction which volatilizes the ether to cause foaming. This heat also serves to cure or set the foamed resin. The fibrous pack associated with the foaming resin is disposed between two confining conveyors 140 and 141 which hold the mass to the desired dimensions. Heat can be applied to the fibrous mass and foaming mixture in zone 142, if desired, to accelerate the foaming and setting of the phenol formaldehyde resin. Product 123 is emitted from zone 142 as a set, dimensionally stable board surfaced with a sheet of flexible film, paper or foil on each face.

A fragmentary section of a product produced by the method described above in FIGURE 6, is shown in FIGURE 8. Strands or fibers 143 are shown dispersed with the foamed resin 144. Although the arrangement of the fibers within the foam follow approximately the arrangement shown in FIGURE 9 through FIGURE 12, the continuous fiber provides more resilience and resistance to compression than when relatively short fibers are disposed within the foam as shown in FIGURE 7. Here discontinuous lengths of fibers are shown within a foam.

The physical properties of a material produced by the method of the invention can be varied within a relatively broad limits by varying the characteristics of the mass of mineral fibers, the identity of the foamable material, and the amount and nature of the foaming agent therein. The effect of variations in extent of bonding between individual fibers upon rigidity of a mass thereof has previously been discussed. The amount of glass or other mineral fibers in the mass, the diameters of the fibers, the modulus of the fibers, the modulus of the binder, the unsupported lengths of fibers, the bond strength of the binder to the fibers, the effect of any coating or strands on the fibers and the orientation of the fibers in the mass all affect the resiliency, the flexibility, the rigidity, the orientation of the fibers in the mass and the load bearing ability of the mass. In general, other factors being equal, the flexibility, the resilience and the load bearing ability or the rigidity of a finished product can be expected to be related to the mass. Other factors also contribute to the physical properties of the final products. For example, whether or not the foamable material is a binder for the glass fibers, whether or not the fibers are wet by the foamed material, whether or not the fibers, the foam cells, or both, are coated by a nonfoamed material, and the physical properties of the foamed material itself are all factors which influence the physical properties of the final product. Several variations in structure of the finished product that can be achieved according to the methods of the invention are shown in FIGURES 14 through 21. In all of these figures the mass of intermeshed mineral fibers is represented as being of the type shown in FIGURE 12, although the same variations can be accomplished where the mass of mineral fibers is of any of the types shown in FIGURES 9, 10 and 11. In each of FIGURES 14 through 21, the three mineral fibers 98, 99 and 100 are shown bonded together as described by globules 101, 102 and 103 of a binder. It will be appreciated that the globules of binder are not necessarily spherical in shape, but may be of any configuration.

In FIGURE 14 a single bubble 104 of a foamed material is shown intimately associated with the fibers 98, 99 and 100. A structure of this type is formed in accordance with the method of the invention when the foam cells are relatively large. The generally spherical shape of the cell or bubble 104 indicates that the ability of the the foamable material to wet the fibers is relatively low.

In FIGURE 15 a single bubble 105 of a foamed material is shown intimately associated with the fibers 98, 99 and 100. The relatively large cell or bubble 105 conforms substantially to the shape formed by the fibers, indicating that the fibers are relatively readily wetted by the foamed material so that the adhesive forces between the fibers and the bubble are comparatively high.

Both of the structures shown in FIGURES 14 and 15 include relatively large bubbles of the foamed material. In FIGURE 16 a preferred structure is shown which includes a plurality of small bubbles 106 of a foamed material. The bubbles are represented as being substantially spheroidal as in the FIGURE 14 structure which is probably an idealized structure as irregular polyhedral cells are to be expected. The small size of the bubbles and their uniform distribution in the FIGURE 16 structure is advantageous because the product has higher thermal insulating properties, greater compression strengths and resiliency. The use of a foamable material having a low surface tension and a finely divided and uniformly distributed foaming agent facilitates the production of such structures.

Still another type of foam bubble 107 is shown in FIGURE 17. Each of these bubbles is generally ovaloid in shape with several of the cells or bubbles having one of the mineral fibers 98, 99 or 100 extending generally therethrough. Such a foam structure is achieved when the foaming material pushes some foaming and possibly also foamable material through the mass of mineral fibers. To form this kind of structure the material must be one which adheres to the mineral fibers. In this case, a thin layer of the foamable material would remain on at least some of the mineral fibers, which layer would be converted to a set condition along with the rest of the material.

A plurality of small bubbles 108 are shown in the FIGURE 18 structure clustered about the mineral fibers 98, 99 and 100.

In general, the conditions which tend to cause a structure of the FIGURE 17 type will cause a structure of the FIGURE 18 type if the foamable material is one which produces a plurality of small bubbles. A finished product which is predominately of the FIGURE 18 type will probably also include some portions which are similar to the FIGURE 16 structure, and in general, portions similar to the structures shown in FIGURES 14, 15 and 17 and may even include some portions similar to structures of FIGURES 9 through 12. Similarly when any of the structures of FIGURES 14 through 17 predominate, corresponding variations can be expected. The properties of the final products depend upon what type of structure predominates. The methods of the invention enable the making of final products wherein any of these structures predominates.

In general, surface tension is a major factor which controls cell size. By decreasing the surface tension of the foamable material or by decreasing the particle or droplet size of the foaming agent and increasing the uniformity of distribution thereof, average cell size of the final foam can be decreased. By increasing the viscosity of the foamable material at the time of foaming, the average cell size after foaming can be decreased and the apparent density of the foam can be increased. When foaming into a confined space, cell size can be decreased and apparent density increased by decreasing the size of the confined space with respect to a given volume of resin and fibre. The nature and amount of blowing agent used and the temperatures also affect the cell size. Suitable wetting agents are polyoxyethylenesorbitan monopalmitate, polyoxyethylene sorbitan trioleate, lauryl sodium sulfate, alkyl aryl polyether alcohols, and alkyl benzene sodium sulfonates.

Many materials can be employed to vary the wetting of and adhesion to the fibers. For example, the above listed wetting agents generally tend to increase the ability of a material to wet as well as to affect the foam cell size by lowering surface tension. The use of various coupling agents to pretreat the fibers also affects the ability of a material to wet and to adhere to the fibers. Where an epoxy, melamine, urea-formaldehyde or phenolic resin is used as the foam, a gama amino propyl triethoxysilane pretreatment of the fibers improves the wetting of and adhesion to the fibers and the strength of the final products. Pretreating the fibers with vinyltriethoxysilane, alkyltriacetoxysilane, or methacrylato chromic chloride gives improved wetting and adhesion where the foamed resin applied is a polyester or polyurethane. Conversely, where it is desired to provide a looser structure, the pretreatment of the fibers with a dimethyl polysiloxane or with octadecyltrichlorosilane will give a poor wetting and a low adhesion product with many resin foams.

The structure shown in FIGURE 19 is similar to that of FIGURE 16 in that it includes a plurality of comparatively small bubbles 109 of a foamable material distributed within the shape formed by the fibers 98, 99 and 100. In the FIGURE 19 structure, however, a second material designated 110 is also distributed in the interstices separating the bubbles 109 and may be co-deposited with the mass of mineral fibers, may be carried into the mass by the foaming resin, or may be introduced by a post-treatment of the article after setting of the foamed material. This second material can be a plurality of flakelets of glass to provide a vapor barrier, metal particles which can be in the shape of powder or flakes and tend to make the product reflective, glass beads which act essentially as fillers, expandable polystyrene beads, or a hardened material such as synthetic resin which tends to reinforce and strengthen the product. In addition, the material 110 can be a pigment, a dye, an inorganic filler such as calcium carbonate, or a low density inorganic filler.

The structure shown in FIGURE 20 comprises a single, relatively large bubble 111 of a foamed material contacting each of the mineral fibers 98, 99 and 100. In addition, however, the entire product after foaming has been treated with a settable material which wets both the mineral fibers and the foamed material well so that this settable material after conversion to a set condition appears as a coating 112 on the surfaces both of the fibers and of the bubble.

FIGURE 21 shows a structure similar to that of FIGURE 15 comprising a single flattened bubble 113 adhered to the mineral fibers 98, 99 and 100 and a coating 114 of a set material adhered to the mineral fibers, and also to the exterior portions of the bubble 113.

Filler material can be added to the product. These fillers include such materials as non-expanded polystyrene beads, resinous microballoons, glass beads, calcium carbonate, silica, pigments, dyes, antiseptic materials, fungicides, clays, aluminum powder or flakes, metal powder or flake.

Materials which can be added to the foaming materials in this invention include those which will function as an anti-oxidant such as triphenylphosphite and materials such as lead salts of 2,6 ditertiary-butylparacresol which is used to protect vinyl compounds against sunlight damage.

Other additives include fire retardants and flame proofing materials including ammonium phosphate, ammonium sulfate, urea, boric acid, ammonium carbonate, tricresyl phosphate, and chlorinated naphthalene.

The following examples are presented solely for the purpose of further illustrating and disclosing the invention and are in no way to be construed as limitations thereon.

*Example 1*

A structure which includes mineral fibers bonded to a foamed, hardened, synthetic resinous binder is produced as follows:

A charge of 16 parts by weight of a soluble ash "A" stage phenolic resin, 0.48 part of bentonite as a thickener, 1.6 parts of ammonium carbonate as a foaming agent, and 5 parts of water is prepared, first adding the bentonite to the water, then the ammonium carbonate, and finally the resin. The mix is then agitated in any suitable way to accomplish a uniform dispersion. The resulting resin dispersion is then injected into a mass of mineral fibers as shown in FIGURES 1, 4, 5 and 6. The mass is then heated dielectrically sufficiently to cause foaming of the resin, which results in an expansion thereof and an intimate association with the mineral fibers and also curing thereof while in a foamed condition with the result that the mineral fibers are bonded to the foamed and hardened phenol formaldehyde resin.

As much as about 0.16 part of polyoxyethylene sorbitan monopalmitate can be added to this foamable binder to produce smaller foam cells.

The foamable and hardenable synthetic resinous material described above can also be used in practicing any of the methods described herein.

*Example 2*

A structure which includes mineral fibers bonded to a foamed, hardened, inorganic cementitious binder is produced according to the following procedure:

0.01 part of polyoxyethylene sorbitan monooleate as a wetting agent and 1.5 parts of magnesium sulfate heptahydrate ($MgSO_4 \cdot 7H_2O$) are dissolved in 1.5 parts of water. 0.25 part of ammonium carbonate and 0.05 part of a fatty alcohol sulfate commercially available under the trade designation "Duponol ME dry," are then added to the solution, followed by one part of calcined brucite (MgO). The entire mix is then subjected to rapid agitation for a period of about one to five minutes. The resulting inorganic cementitious binder dispersion is then injected into a mass of intermeshed mineral fibers. The mass is heated to a temperature of about 180° F. to about 250° F. for from about one-half to five minutes. The heating causes foaming of the binder dispersion and also hardening thereof, while in a foamed condition with the result that the mineral fibers are bonded to the foamed and hardened inorganic cementitious binder which is a magnesium oxysulfate cement.

The foamable and hardenable cementitious inorganic binder dispersion described above can also be used in the other methods which have been described.

*Example 3*

Another foamable, hardenable, inorganic cementitious binder which is utilized in practicing the method of the invention as described in Example 2 can be produced according to the following procedure:

A solution is prepared from 0.48 part of water, 0.01 part of polyoxyethylene sorbitan monooleate, 0.05 part of a fatty alcohol sulfate commercially available under the trade designation "Duponol ME dry" and 0.15 part of ammonium carbonate. One part of calcium sulfate hemihydrate ($CaSO_4 \cdot \frac{1}{2}H_2O$) is then thoroughly mixed with the resulting solution to produce a foamable, hardenable, gypsum-type cementitious inorganic binder. This binder is used as described in Example 2.

*Example 4*

A foamable phenol formaldehyde binder is produced by mixing 20 parts by weight of a low, free formaldehyde phenol formaldehyde partial condensation product commercially available under the trade designation "Bakelite BRL2759" with 80 parts by weight of a low, free formaldehyde phenol formaldehyde partial condensation product commercially available under the trade designation "Bakelite BRL2760." The mixing is carried out with rapid agitation to beat air into the mix. A second mix is prepared from 6.6 parts by weight of isopropyl ether as a foaming agent and 1.0 part of polyoxyethylene sorbitan monopalmitate and the second mix added to the resin mixture; agitation is continued. 6.5 parts by weight of concentrated sulfuric acid and 0.91 part by weight of concentrated phosphoric acid are poured over 6.5 parts by weight of ice; when the ice melts, the acid solution is added to the resin mix to produce a foamable resin, as illustrated in FIGURE 6. The foamable mixture is injected into a mass of intermeshed glass fibers having an apparent density of 0.5 pound per cubic foot. The resin is allowed to foam and cure for about 5 to 10 minutes.

The final product is a foamed phenolic binder bonded to the glass fibers, the product having an apparent density of 2 pounds per cubic foot. It is suitable for structural use; it can be sawed, and is capable of receiving nails. The product can be subdivided, for example, to about the size of popped corn or smaller and blown into place as a dimensionally stable insulating material.

*Example 5*

A foamable resin suitable for use as described above is produced by mixing 100 parts by weight of a polyester resinous composition commercially available under the trade designation "Plaskon FFR-5," 10 parts by weight of water, 1 part by weight of N-methyl morpholine, and 1 part by weight of an emulsifier which is commercially available under the trade designation "Witco 77-86," and then adding 210 parts by weight of toluene diisocyanate. A hard, high density fire resistant product (about 12.7 pounds per cubic foot), which is capable of receiving nails and can be used as a wood substitute, is produced from this foamable binder.

Various products made in accordance with the invention comprising a mass of intermeshed mineral fibers intimately associated with a foamed material can be porous in nature. It is sometimes desirable to reduce or eliminate the porosity. This can be accomplished after the porous product has been made, for example, by impregnating the porous product with a suitable binder which can be organic or inorganic in nature, and can be any of the binders or treatments previously discussed. A specific example of a suitable impregnating binder can be produced from 27 parts of colloidal silicic acid and 73 parts of water. Any product of the invention having open pores can be impregnated with this binder, for example, by soaking the product therein. If some porosity is desired in the final product, that product after saturation can be subjected to a partial vacuum in order to remove excess binder. The silicic acid binder tends not only to improve the physical properties of a porous product, but also to impart fireproof characteristics thereto.

Products manufactured in accordance with the invention can be made having various densities. By way of example, masses of glass fibers having densities of from 2 to 10 pounds per cubic foot have been incorporated into 65 pounds per cubic foot products made with foamed cementitious magnesium oxysulfate and gypsum cements as binders. It is comparatively easy to achieve final product densities as low as 1 to 10 pounds per cubic foot, for example, by intimately associating a foamed binder having a density of about ½ to 7 pounds per cubic foot with a mass of intermeshed mineral fibers having a density of about ½ to 3 pounds per cubic foot. Impregnating such a product with an appropriate binder increases the apparent density of the product somewhat, but it is advantageous where specific properties are required.

If desired, thickeners can and may advantageously be mixed with certain foamable materials used in practicing the invention. Thickeners are principally advantageous with foamable phenolic materials. Examples of useful thickeners include sodium alginate, ammonium alginate, bentonite, gelatin, carboxy methyl cellulose, methyl cellulose, and others.

Various changes and modifications can be made within the spirit and scope of the appended claims.

We claim:
1. A process for producing a structure comprising mineral fibers bonded to a foamed binder comprising advancing a pack of mineral fibers through a working zone, inserting injection needles into the advancing pack and injecting a binder into said pack through said needles while in said working zone, progressively injecting binder throughout the thickness of the pack and to the opposed major face of said pack to distribute the binder uniformly throughout the pack, removing the injection needles from the pack of mineral fibers as the pack leaves the working zone, and foaming the binder while intimately associated with said accumulation of mineral fibers.

2. The process of claim 1 wherein the inserted injecting needles are advanced along with the advancing pack of mineral fibers while in the working zone.

3. A process of producing a bonded structure by causing a binder to foam throughout a pack of fibers comprising providing fibrous material in a resilient, integral, porous pack of intermeshed fibers, injecting a binder through injection needles into the pack of intermeshed fibers while they are supported but unconfined, confining the pack of intermeshed fibers while the binder foams throughout the pack, and foaming the binder while continuing the confining of the pack to control the density of the bonded structure which results.

4. A process for producing a structure which includes mineral fiber bonded to a foamed, set binder, which method comprises advancing an integral unconfined pack of intermeshed fibers, injecting binder through injection needles at various levels throughout the thickness of said pack to a portion of said advancing pack, injecting a binder through injection needles into successive portions of said unconfined advancing pack, and foaming the binder within the pack to a set, foamed condition while confining the advancing pack to desired dimensions to control the final density of the bonded structure so formed.

5. A method for producing a fiber glass structure bonded with a foamed binder comprising advancing an integral, unconfined pack of intermeshed fibers into a working zone, injecting a binder and glass flake into the pack at various levels throughout the thickness of the pack, injecting binder and glass flake into successive portions of said unconfined advancing pack, and foaming the binder while confining the advancing pack to desired dimensions to control the density of the glass flake, fiber glass and foam product.

References Cited in the file of this patent

UNITED STATES PATENTS

| | | |
|---|---|---|
| 1,818,874 | Ulrich | Aug. 11, 1931 |
| 2,078,525 | Bruesewitz | Apr. 27, 1937 |
| 2,140,063 | Talalay | Dec. 13, 1938 |
| 2,180,304 | Minor | Nov. 14, 1939 |
| 2,194,036 | Talalay | Mar. 19, 1940 |
| 2,306,318 | Owen | Dec. 22, 1942 |
| 2,440,399 | Hill | Apr. 27, 1948 |
| 2,574,849 | Talalay | Nov. 13, 1951 |
| 2,596,565 | Kautenberg | May 13, 1952 |
| 2,664,406 | Armstrong | Dec. 29, 1953 |
| 2,687,979 | Talalay et al. | Aug. 31, 1954 |
| 2,719,806 | Nottebohm | Oct. 4, 1955 |